Patented June 16, 1942

2,286,407

UNITED STATES PATENT OFFICE 2,286,407

PROCESS FOR PRODUCING FORMIC ACID

Paul Halbig, Fribourg, Switzerland, assignor to the firm: Lonza Elektrizitätswerke und Chemische Fabriken Aktiengesellschaft (Gampel), Basel, Switzerland No Drawing. Application December 10, 1940, Serial No. 369,493. In Switzerland December 20, 1939

12 Claims. (Cl. 260—542)

This invention relates to a process for producing formic acid.

It has been found that the esters of formic acid and tertiary alcohols split up into formic acid and the olefine of the respective alcohol, according to the following general chemical equation:

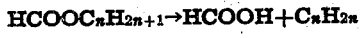

wherein $HCOOC_nH_{2n+1}$ is the ester of formic acid and a tertiary alcohol and $C_nH_{2n}$ the respective olefine.

The reaction takes place on heating the respective ester; the decomposition is accelerated by means of catalysers, particularly such of acid nature, as, for instance, phosphoric acid, sulphuric acid, acid salts, silicagel, chloride of zinc etc. Formic acid itself effects a particularly smooth reaction, in a liquid phase, at a relatively low temperature.

The reaction takes place in a uniform manner, practically without formation of water and carbon monoxide, and constitutes a new and cyclic process for the preparation of formic acid, it being well known that the ester can easily be obtained from the respective alcohol and carbon monoxide by means of a catalyst, such as alkali alcoholate, and also that the olefine may easily be converted to tertiary alcohol, by catalytic addition of water. In this manner, formic acid, practically free of water, is obtained from carbon monoxide and water, without addition of stoichiometric quantities of other chemicals.

The tertiary alcohols which can be employed include trimethylcarbinol, diamethyl-ethylcarbinol and dimethylpropylcarbinol.

240 weight parts of ester of formic acid and dimethylethyl-carbinol are heated and brought to boiling, together with 21 weight parts of formic acid, in a container provided with a column. The temperature of the boiling liquid is at first approximately 108° C. subsequently it quickly falls to 75° C., during which a strong development of amylene takes place, and then it again rises to about 102° C., although, with a slight run back, the head of the column shows a temperature of 35–40° C. The distillate consists of about 150 weight parts of trimethylethylene with a slight content of formic acid and the distillate residue is composed of about 114 weight parts, containing more than 96% formic acid.

The distilled olefine may be re-converted in well known manner by catalytic addition of water, for instance by treating it with 68% sulphuric acid, to the respective tertiary alcohol, and the latter may be converted by means of carbon monoxide, preferably applying pressure, to ester of formic acid. This ester of formic acid may be again split up to produce formic acid, and, in this manner, the preparation of formic acid may be obtained in a cyclic process.

The conversion of olefine to alcohol presents some difficulties. As known, the respective olefines are absorbed in sulphuric acid forming reaction mixtures which contain the ester of sulphuric acid of the tertiary alcohol, besides free alcohol. Saponification of the ester of sulphuric acid, and the isolation of alcohol, are usually effected by distilling the reaction mixture which is diluted with water. In this operation, a part of the alcohol is lost inasmuch as, influenced by the sulphuric acid and the higher temperature required for distillation, a redecomposition to olefine and water takes place and, worse still, a polymerisation to higher hydrocarbons, whereby di-isobutylene and di-amylene are obtained as by-products. It is evident that the process of preparing formic acid in the above mentioned cyclic process entails losses of olefine and tertiary alcohol which might be disadvantageous in an industrial procedure.

It has been found that these losses can be practically completely avoided by treating the reaction-liquid which originates from the treatment of the respective olefines with sulphuric acid diluted with water in concentration between 30–70%, and preferably 40–60%, and simultaneously, or subsequently washing it out with a slightly soluble or insoluble solvent for the respective alcohol, in order to decompose the washing liquid which has separated from the diluted sulphuric acid, and which contains solvent and alcohol, into its components, for instance by distillation. Olefines corresponding with the tertiary alcohols may be employed as solvents, for instance isobutylene, amylene, dimethylethylene. Other solvents, difficultly soluble in water, may also be used, such as benzine.

According to the present invention, it will thus be seen that formic acid may be produced from carbon monoxide and water by combining the following steps of procedure:

(1) *Decomposition.*—Ester of formic acid and a tertiary alcohol is split up into olefines and formic acid by heating, preferably in the presence of formic acid.

(2) *Hydration.*—Olefines are brought into contact with sulphuric acid in concentration of 30–70%, preferably 40–60%, and a reaction-mixture is produced containing ester of sulphuric acid of the alcohol corresponding with the olefine, also free alcohol.

(3) *Isolation of the alcohol.*—(a) The reaction-liquid is treated with water and washed out with a solvent for the tertiary alcohol which is slightly soluble or insoluble in water. Two different liquid layers are thereby formed, the washing liquid containing alcohol and the solvent, and diluted sulphuric acid, free from alcohol. These are drawn off separately and the sulphuric acid is concentrated and employed for a new hydration, according to Step 2 while (b) the washing liquid is separated, for instance by distillation, into alcohol and solvent which latter is again employed for washing out, according to Step 3(a).

(4) *Addition of carbon monoxide.*—Ester of formic acid is obtained from the alcohol by catalytic action of carbon monoxide, preferably under pressure, and further employed according to Step 1.

By means of the procedure described, it is, therefore, possible to produce anhydrous formic acid from carbon monoxide and water in a closed cyclic process, without stoichiometric requirement of further chemicals.

In this manner, it is possible to avoid loss of any decisive quantity of olefine and alcohol and to insure a continuous procedure in columns.

In regard to the addition of carbon monoxide, according to Step 4, the alkali-alcoholate of the alcohol employed has proved to be a good catalyst. The new working method also allows a further simplification of the procedure in this respect, inasmuch as it is possible to produce the necessary alkali-alcoholate in a simple and economic manner when isolating the alcohol, as follows: The column assigned to the separation of the water and the solvent is continuously charged with a small quantity of an alkali-hydroxide—about 1% of the alcohol quantity is sufficient—for instance, a 45% caustic soda solution; the alkali, together with the alcohol, is converted into alkali-alcoholate and water, the latter distilling off, whereas the alcoholate, dissolved in the alcohol running out, leaves the fractionating column and serves as a catalyst, when the subsequent conversion of alcohol into ester of formic acid takes place, according to Step 4.

An example of the invention is given below, including the entire procedure, in which, trimethylethylene and amylene-hydrate respectively are employed as olefine and washing medium and tertiary alcohol respectively. Quantities are stated in weight-parts.

116 parts ester of formic acid and tertiary-amyl-alcohol are brought every hour to the upper part of a distilling column; in its lower part, formic acid is kept boiling in such a manner that the temperature there is approximately 100° C., and about 35° C. at the top of the column. By means of a dephlegmator, a slight run back in the column is caused. The hourly product of distillation is about 70.5 parts of trimethylethylene containing approximately 1% formic acid, whereas 45 parts of anhydrous formic acid may be drawn from the column. For the purpose of eliminating the small quantity of formic acid therein, the trimethylethylene is washed with a little water, and it is treated then in a suitable mixing-apparatus with an equal quantity of 50% sulphuric acid, at a temperature of 10–30° C., until solution takes place. This procedure may well be kept up continuously by permanently flowing amylene and sulphuric acid into the mixing-apparatus and allowing the reaction-solution to flow off, the size of the apparatus being chosen to permit reaction taking place in about an hour's time. The solution contains about 83% of the amylene in the form of amyl-sulphuric acid and amyl hydrate, the remaining amylene keeping unaltered. (Under certain conditions, for instance, by applying greater quantities of sulphuric acid, a practically 100% use of the amylene may be attained.) Every hour, 170 parts of the solution are introduced into the middle of a washing-tower which may, for instance, be a tube filled with "Raschig" rings. About 70 parts of water flows into the top of the tower hourly, and 85 parts of amylene enter its bottom end. On its way down, the water washes out the sulphuric acid, and the rising amylene frees it from amylene hydrate; simultaneously, the amyl-sulphuric acid is quantitatively converted into amyl hydrate and water. A solution of amyl hydrate in amylene with a small quantity of water continually leaves the top of the tower, and approximately a 36% sulphuric acid its lower end. The former flows continuously to a fractionating column, where it is decomposed in known manner into amylene, water, and amyl hydrate. The water is again led to the washing-tower, 85% of the amylene also returns to the washing-tower, the rest is subjected to hydration. The column supplies 88 parts of amyl hydrate every hour, i. e. more than 99% of the hydrated amylene. The sulphuric acid leaving the washing-tower at its lower end amounts to about 118 parts with a percentage of about 36%, and containing less than 0.7 part of amyl hydrate; it is brought to about 50% concentration by distilling off water, and then again employed for the purpose of hydration. The product of distillation with a small content of amyl hydrate goes back to the washing-tower. Every hour, and continuously, 2 parts of a 45% caustic soda solution are added drop by drop to the upper part of the fractionating column, and the amyl alcohol leaving the bottom end of the column contains the corresponding amounts of sodium amylate. This alcohol is continually passed through sealed tubes, connected in series, which are subjected to such high pressure in the counter-current of carbon monoxide that a complete chemical conversion to ester of formic acid practically takes place. By distillation, or by washing with a little water, or by adopting both means, the ester is freed from the small quantity of catalyser and, as already described, splits up into formic acid and amylene.

What I claim is:

1. The process of producing formic acid which comprises splitting up esters of formic acid and tertiary alcohols into olefines and formic acid by heating.

2. The process of producing formic acid which comprises splitting up ester of formic acid and tertiary alcohols into olefines and formic acid by heating in the presence of formic acid.

3. The process of producing formic acid, comprising the following steps in combination: splitting up esters of formic acid and tertiary alcohols into olefines and formic acid by heating, conversion of the olefine into the corresponding tertiary alcohol by catalytic addition of water, conversion of the tertiary alcohol into ester of formic acid by catalytic action of carbon monoxide, and returning the ester to the first step.

4. A cyclic process of producing formic acid, comprising the following steps: continuously splitting up esters of formic acid and tertiary alcohols into olefines and formic acid by heating, continuously converting the olefine into the corresponding tertiary alcohol by catalytic addition of water, continuously converting the tertiary alcohol into ester of formic acid by catalytic action of carbon monoxide, and returning the ester to the first step.

5. The process of producing formic acid, comprising the following steps: splitting up esters of formic acid and tertiary alcohols into olefines and formic acid by heating, conversion of the olefine into the corresponding tertiary alcohol by catalytic addition of water, conversion of the tertiary alcohol into ester of formic acid by catalytic action of carbon monoxide under pressure, and returning the ester to the first step.

6. The process of producing formic acid, comprising the following steps: splitting up esters of formic acid and tertiary alcohols into olefines and formic acid by heating, forming a reaction-liquid containing ester of sulphuric acid and tertiary alcohol by treating the olefine with 30–70% sulphuric acid, treating this reaction-liquid with water and washing out with a solvent for the tertiary alcohol slightly soluble in water, separating the dilute sulphuric acid from the washing-liquid containing solvents and alcohol, decomposing the washing-liquid into alcohol and olefine converting the tertiary alcohol into ester of formic acid by catalytic action with carbon monoxide, and returning the ester.

7. The process of producing formic acid, comprising the following steps: splitting up esters of formic acid and tertiary alcohols into olefines and formic acid by heating, forming a reaction liquid containing ester of sulphuric acid and tertiary alcohol, by treating the olefine with 30–70% sulphuric acid, treating this reaction-liquid with water and washing out with a solvent for the tertiary alcohol insoluble in water, separating the dilute sulphuric acid from the washing-liquid containing solvents and alcohol, decomposing the washing-liquid into alcohol and olefine, converting the tertiary alcohol into ester of formic acid by catalytic action with carbon monoxide and returning the ester to the first step.

8. The process of producing formic acid, consisting of the following steps: splitting up esters of formic acid and tertiary alcohols into olefines and formic acid by heating, forming a reaction-liquid containing ester of sulphuric acid and tertiary alcohol by treating the olefine with 30–70% sulphuric acid, treating this reaction-liquid with water and washing out with a solvent for the tertiary alcohol slightly soluble in water, separating the dilute sulphuric acid from the washing-liquid containing solvents and alcohol, decomposing of the washing-liquid into alcohol and olefine, adding alkaline hydroxide with resulting formation, together with the tertiary alcohol, of some alkali-alcoholate to serve as a catalyser for the formation of ester converting the tertiary alcohol into ester of formic acid by catalytic action of carbon monoxide, and returning the ester to the first step.

9. The process of continuous producing of formic acid, comprising the following steps: splitting up esters of formic acid and tertiary alcohols into olefines and formic acid by heating, forming a reaction-liquid containing ester of sulphuric acid and tertiary alcohol by treating the olefine with 30–70% sulphuric acid, treating this reaction-liquid with water in a washing-column and with simultaneous introduction of a solvent in counter-current, drawing off, in the upper part of the column, the washing-liquid containing alcohol and olefine, and the dilute sulphuric acid in the lower part of the column; decomposing the washing-liquid in a fractionating column into olefine, tertiary alcohol and water, converting the tertiary alcohol into ester of formic acid by catalytic action of carbon monoxide, and returning the ester to the first step.

10. The process of continuous producing of formic acid, comprising the following steps: splitting up of ester of formic acid and tertiary olefine with sulphuric acid of 30–70%, treating forming a reaction-liquid containing ester of sulphuric acid and tertiary alcohol by treating the olefine with sulphuric acid of 30–70% treating this reaction-liquid with water in a washing-column and with simultaneous introduction of a solvent in counter-current, drawing off, in the upper part of the column, the washing-liquid containing alcohol and olefine, and the diluted sulphuric acid in the lower part of the column, decomposing the washing-liquid in a fractionating column into olefine, tertiary alcohol and water, dropping alkali hydroxide in solution into the fractionating column with resulting formation, together with the tertiary alcohol, of some alkali-alcoholate to serve as a catalyser for the formation of ester, converting the tertiary alcohol into ester of formic acid by catalytic action of carbon monoxide, and returning the ester to the first step.

11. The process of producing formic acid which comprises splitting up esters of formic acid and tertiary alcohols into olefines and formic acid by heating to about 100° C.

12. The process of claim 10 in which the temperature is maintained at about 100° C. at the bottom of the column and about 35° C. at the top.

PAUL HALBIG.